INVENTORS
HANS R ROTTMANN
BY WILLIAM E JOHNSON

ATTORNEYS

June 27, 1967    W. E. JOHNSON ETAL    3,328,593
APPARATUS FOR MEASURING THE WALL THICKNESS OF GLASS CONTAINERS
Filed July 29, 1963    6 Sheets-Sheet 2
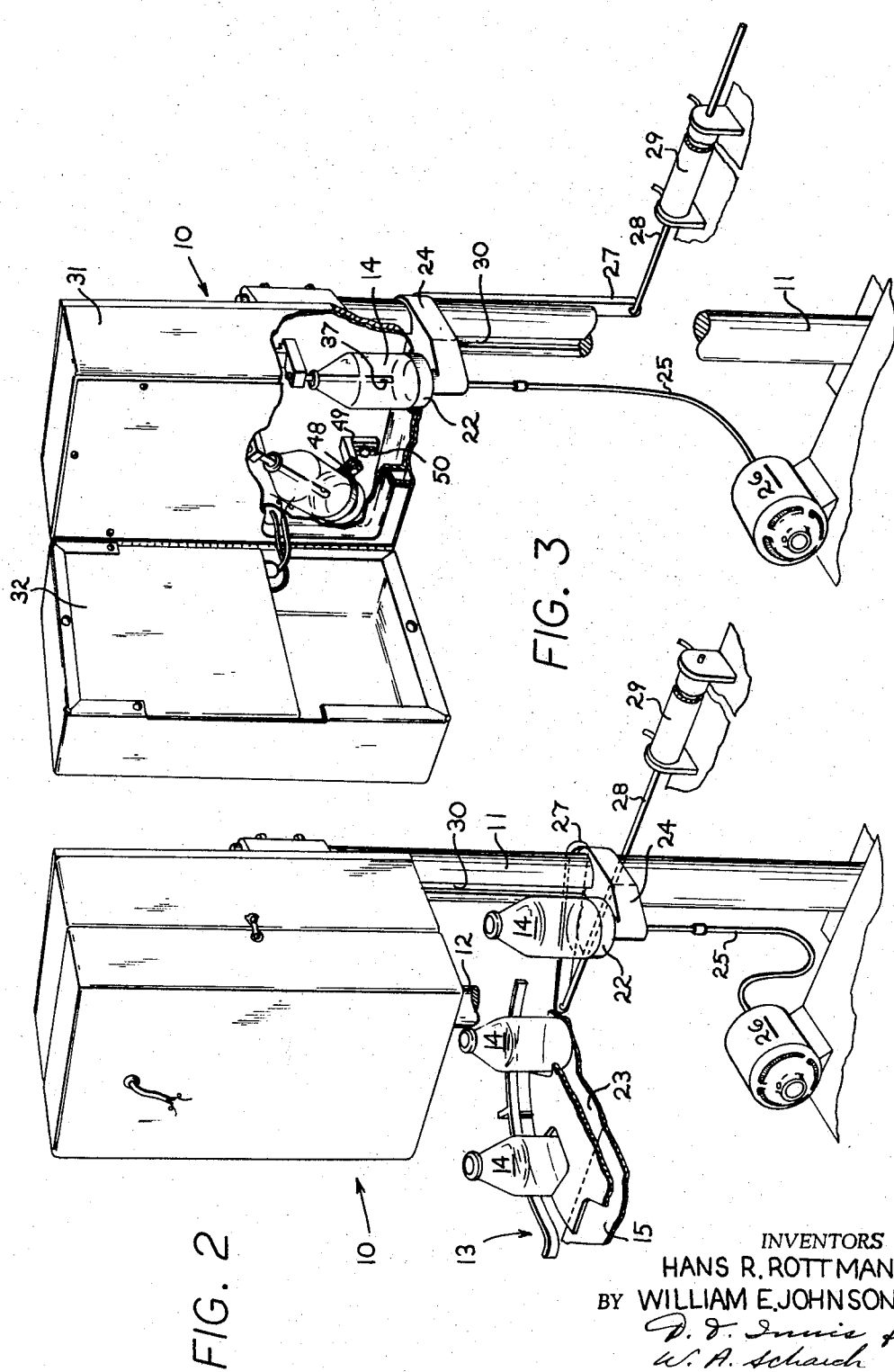
INVENTORS
HANS R. ROTTMANN
BY WILLIAM E. JOHNSON
ATTORNEYS

INVENTORS
HANS R. ROTTMANN
BY WILLIAM E. JOHNSON
ATTORNEYS

June 27, 1967     W. E. JOHNSON ETAL     3,328,593
APPARATUS FOR MEASURING THE WALL THICKNESS OF GLASS CONTAINERS
Filed July 29, 1963     6 Sheets-Sheet 4

INVENTORS
HANS R ROTTMANN
BY WILLIAM E JOHNSON
ATTORNEYS

June 27, 1967 W. E. JOHNSON ET AL 3,328,593
APPARATUS FOR MEASURING THE WALL THICKNESS OF GLASS CONTAINERS
Filed July 29, 1963 6 Sheets-Sheet 5

INVENTORS
HANS R. ROTTMANN
BY WILLIAM E JOHNSON
ATTORNEYS

June 27, 1967     W. E. JOHNSON ET AL     3,328,593
APPARATUS FOR MEASURING THE WALL THICKNESS OF GLASS CONTAINERS
Filed July 29, 1963     6 Sheets-Sheet 6
FIG. 8
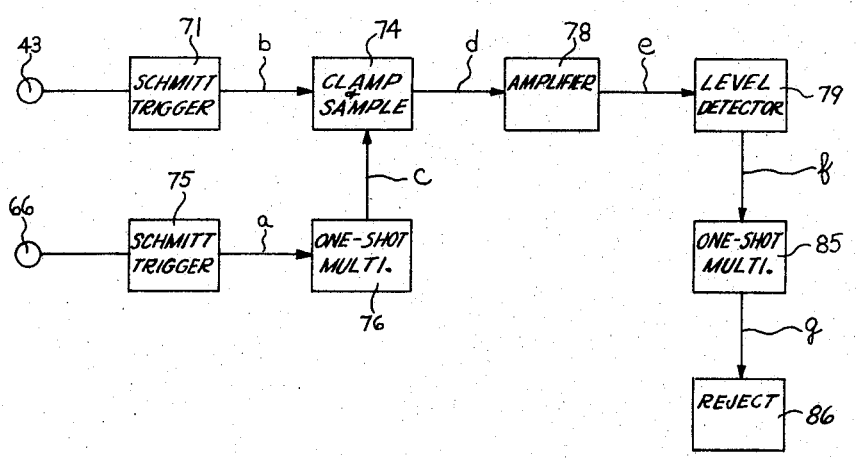
FIG. 9
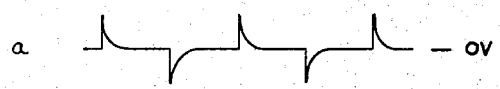
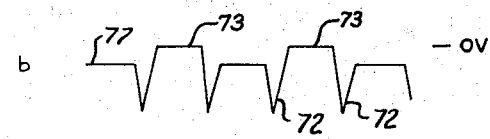
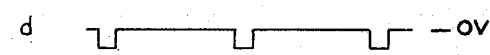
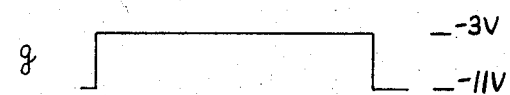
INVENTORS
HANS R. ROTTMANN
BY WILLIAM E. JOHNSON
ATTORNEYS United States Patent Office 3,328,593
Patented June 27, 1967

3,328,593
APPARATUS FOR MEASURING THE WALL THICK-
NESS OF GLASS CONTAINERS
William E. Johnson and Hans R. Rottmann, Toledo, Ohio,
assignors to Owens-Illinois, Inc., a corporation of Ohio
Filed July 29, 1963, Ser. No. 298,141
10 Claims. (Cl. 250—223)

This invention relates to apparatus for comparing the wall thickness of hollow transparent containers with a standard container of predetermined wall thickness.

More particularly, this invention relates to apparatus for comparing the wall thickness of hollow transparent containers made of glass by comparing the optical transmissibility of a test container with a standard container of known wall thickness and optical transmission properties.

Applicants have found that when the thickness of a wall of a glass container is measured by the optical transmission method, particularly when the container is made of a colored glass, it is necessary to know how much of the light is being absorbed by the color changes taking place during the continuous production of containers. To obviate this, applicants compare the light transmission properties of a test container and a standard container wherein the standard container is replaced at frequent intervals so as to avoid erroneous comparisons. Further, a single light source is used to illuminate both the test container and the standard container and a single light sensitive device is used to view the light alternately passing through the test container and standard container. A chopping disc interrupts the two light paths and also interrupts a trigger-timing system for determining when signals are transmitted from the light sensitive pick-up to the comparing circuit.

It has been the practice in the past to measure the absolute light transmission properties of hollow transparent containers and to use the resultant signal output as a reject signal in those situations where the container wall thickness is outside predetermined limits.

An example of prior art apparatus is disclosed in U.S. Patent No. 2,755,703 issued July 24, 1956, to Politsch et al. The type of apparatus disclosed in Politsch et al. obviously depends upon the use of a constant source of radiation and also is dependent upon an assurance that the light absorbing properties of the glass wall that is being gauged is constant throughout the production run of containers as they are being checked. In those situations where it is desirable to gauge containers of the type that have a color incorporated within the glass, for example, green soda bottles or amber beer bottles, it has been found that the color of the bottles actually may change over an extended run from any one furnace and that the transmission properties of the container may change due to color change to a greater extent than due to wall thickness changes.

Even in the situation where clear containers are being formed, the radiation absorption properties of the clear glass bottles may change over an extended period of production. In other words, the containers produced at the beginning of a run may have different absorption properties from later produced bottles.

With the foregoing in view, it has been determined that it is necessary to periodically adjust the prior art apparatus with changes in transmission. This adjustment of the gauging level of a device such as described in Politsch et al. is one which must be done with exceeding care and great attention to detail. In view of the care which must be exercised in adjusting an optical inspection apparatus, it has been found necessary that only qualified technical personnel can successfully make the required adjustments so that the device will operate properly.

With the foregoing in view, it is an object of this invention to provide apparatus for comparing the wall thickness of test containers with the wall thickness of a standard container which has been recently produced from the same glass as the containers which are being tested so that the absorption properties of the glass will be compensated for.

It is a still further object of this invention to provide apparatus for comparing test container wall thickness with standard container wall thickness and to reject those containers which have a wall thickness of a predetermined amount less than the standard container.

It is a still further object of this invention to provide apparatus for comparing the wall thickness of a standard container with the wall thickness of test containers in which variations in the intensity of the light being used to gauge will not affect the operation of the device.

It is a still further object of this invention to provide apparatus for comparison inspecting of containers to determine their wall thickness in which a single light source and a single photosensitive pick-up is utilized.

It is a still further object of this invention to provide apparatus for optically comparing the transmission properties of a test article and a standard article, wherein a common light source and a common photosensitive device is used and the optical paths are of equal length.

Other and further objects will be apparent from the following description taken in conjunction with the annexed sheets of drawings, wherein:

FIGS. 2 and 3 are perspective views illustrating the mechanism for handling the test containers at the inspection station;

FIG. 8 is a schematic block diagram of the electronic system connected to the photosensitive pick-ups;

FIGS. 9a–9g are illustrations of the pulses or wave forms taken at various points in the circuit of FIG. 8.

Figure 1:
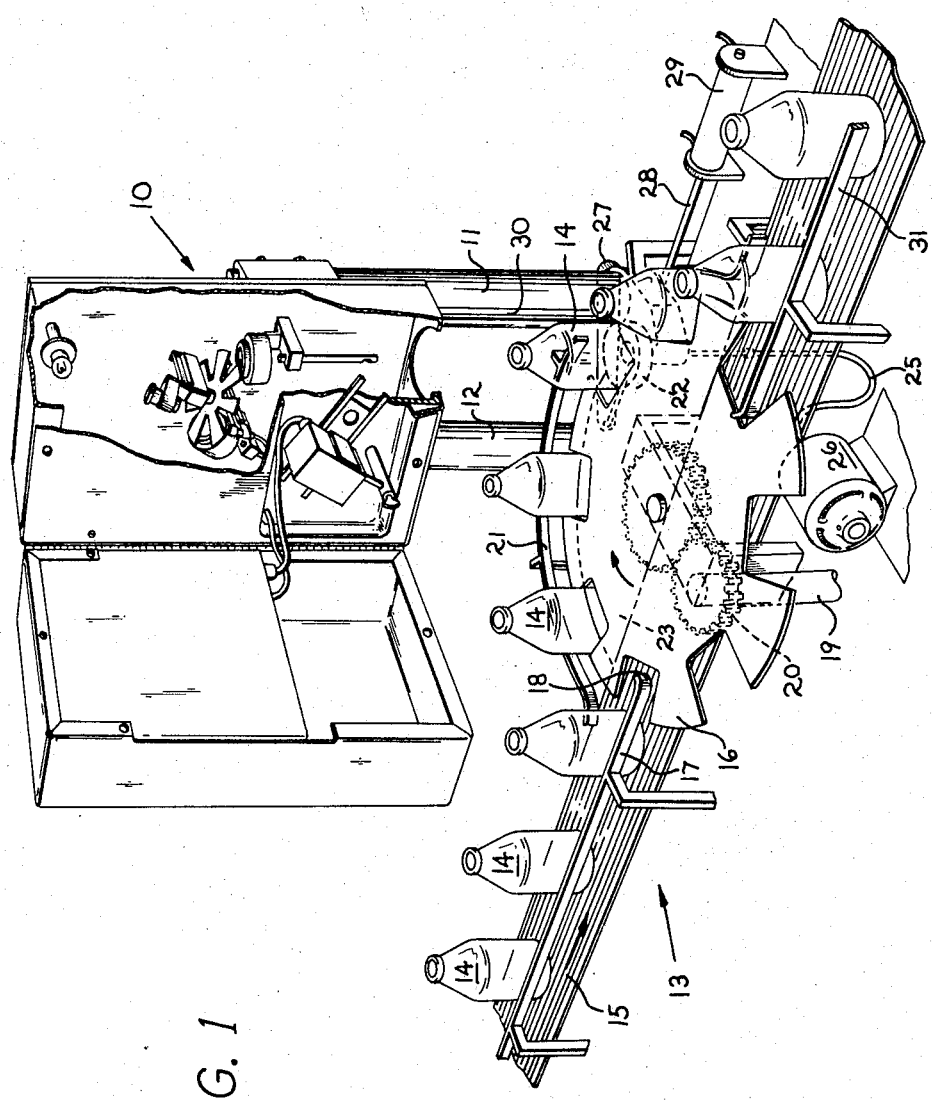
FIG. 1 is a perspective view of the apparatus of the invention with parts broken away and showing the mechanism for bringing test containers into gauging position with respect to the inspecting device.

Referring specifically to FIGS. 1–3, the apparatus of the invention comprises an inspection unit, generally designated 10, which is mounted on a pair of supporting legs 11 and 12. A bottle conveying and indexing mechanism, generally designated 13, serves to bring test containers 14 into position preparatory to insertion within the inspection unit 10. Basically, the indexing mechanism comprises a continuously moving conveyor 15 moving in the direction of the arrow shown thereon and adapted to support test containers in line thereon. Thus, the containers are moved toward a star wheel 16 formed with cutout portions or slots which are wider than the diameter of the ware or bottles to be handled.

A horizontal guide rail 17 is mounted adjacent the conveyor 15 and spaced thereabove to provide a guide for the containers moved by the conveyor 15 and serves to prevent the containers from accidentally falling from the side of the conveyor 15. One end of the guide rail is slightly turned inward at 18 to assist the movement of the test containers in the direction of movement of the star wheel 16. The star wheel 16 is driven by a suitable source of power through the drive shaft 19 and gear train 20, it being understood that the drive is intermittent or indexing in the sense that the containers 14 are moved approximately 45° during each testing interval.

A second guide rail 21 retains the containers 14 within the slots formed in the star wheel during their arcuate movement from the conveyor 15 to the test container support pad 22. It should be understood that beneath the star wheel 16 a flat plate 23 is provided at approximately the same elevation as the conveyor 15 so that sliding transfer of the bottles from the conveyor to the plate 23 may be made without danger of tipping the ware.

As best shown in FIGS. 2 and 3 the pad 22, to which the test containers are successively moved, is mounted for rotation in its support bracket 24 and the pad 22 is rotated through a flexible drive shaft 25 by a motor 26. Rotation of the pad 22 obviously rotates the test container positioned thereon about its vertical axis. With the test container positioned on the pad 22, the bracket 24 is moved vertically to position the container within the inspection unit. It should be understood that the vertical movement of the bracket 24 and the test container carried thereby is done in such a fashion that the container is scanned vertically during its insertion and withdrawal from the inspection unit. Rotation of the pad 22 with the container resting thereon provides horizontal scanning of the container wall by the inspection unit. Thus, the combined vertical and rotational movements of the pad 22 and the container insures that substantially the entire wall surface of the container is inspected.

The mechanism for raising the bracket 24 comprises a pivoted arm 27 which is pivotally connected at one end to the bracket 24 and has its other end pivotally connected to a piston rod 28. The piston rod 28 is reciprocated by a hydraulic motor 29. The bracket 24 surrounds the leg 11 and is provided with an internal key which fits within a vertical keyway 30 in the leg 11. Thus, it can be seen that reciprocation of the piston rod 28 will cause vertical reciprocation of the bracket 24.

An example of mechanism which may be utilized for this purpose is disclosed in the above-referred-to Politsch et al. patent.

As can readily be seen, the bracket 24 is prevented from rotating with respect to the leg 11 by its key being in engagement with the keyway 30 and its movement is limited to vertical reciprocation. The final position of the bottle in relation to the inspection apparatus may be adjusted by adjusting the inspection apparatus itself, relative to its supporting legs 11 and 12. After the bottle has been inspected and the pad 22 retracted, the star wheel 16 will move tested containers out of the inspection station and move the next bottle into testing position. The tested bottles are then moved onto the conveyor 15 and are moved away from the inspection unit. A guide rail 31 is positioned adjacent the conveyor 15 downstream of the inspection unit and serves to align the inspected containers on the conveyor 15. After inspection, the containers will be conveyed to the next operation.

Figure 4:
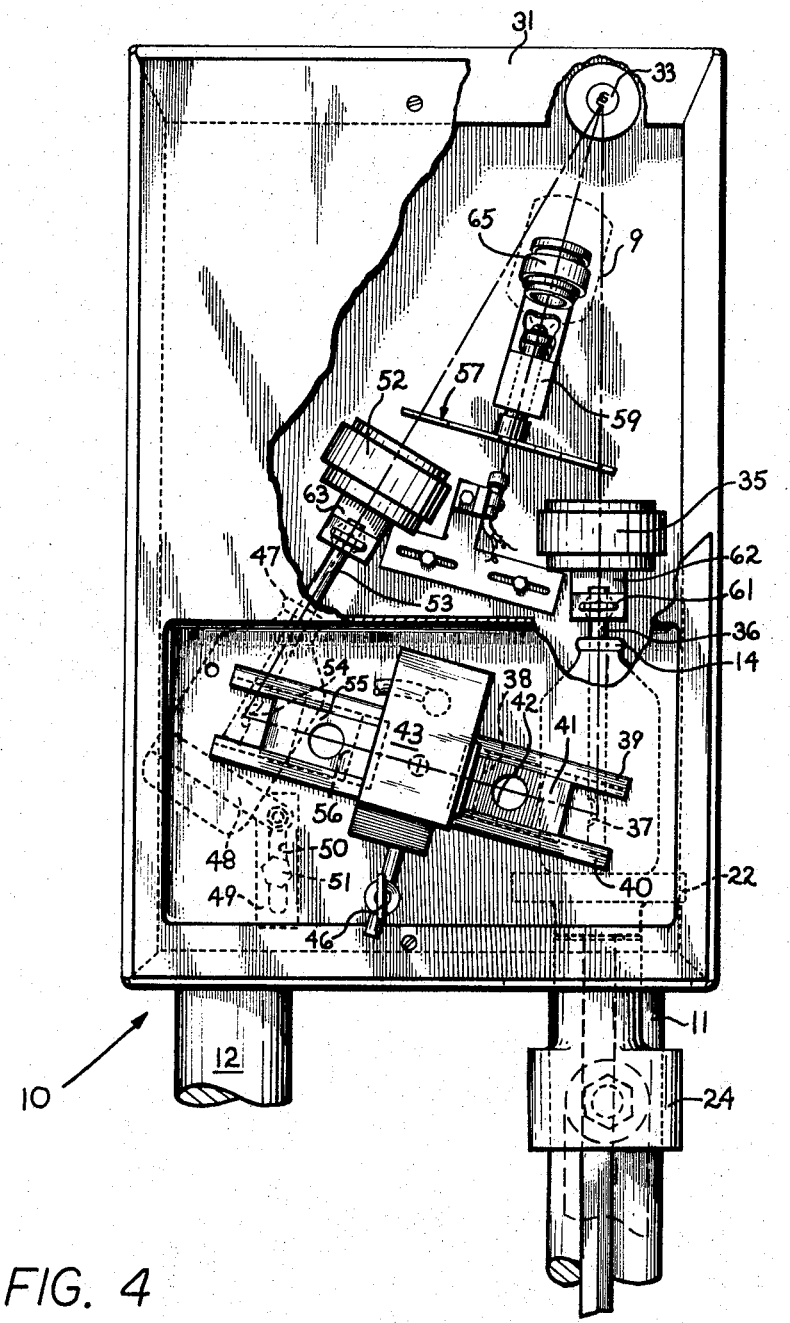
FIG. 4 is a front elevational view with parts broken away illustrating the optical comparing device.
Figure 5:
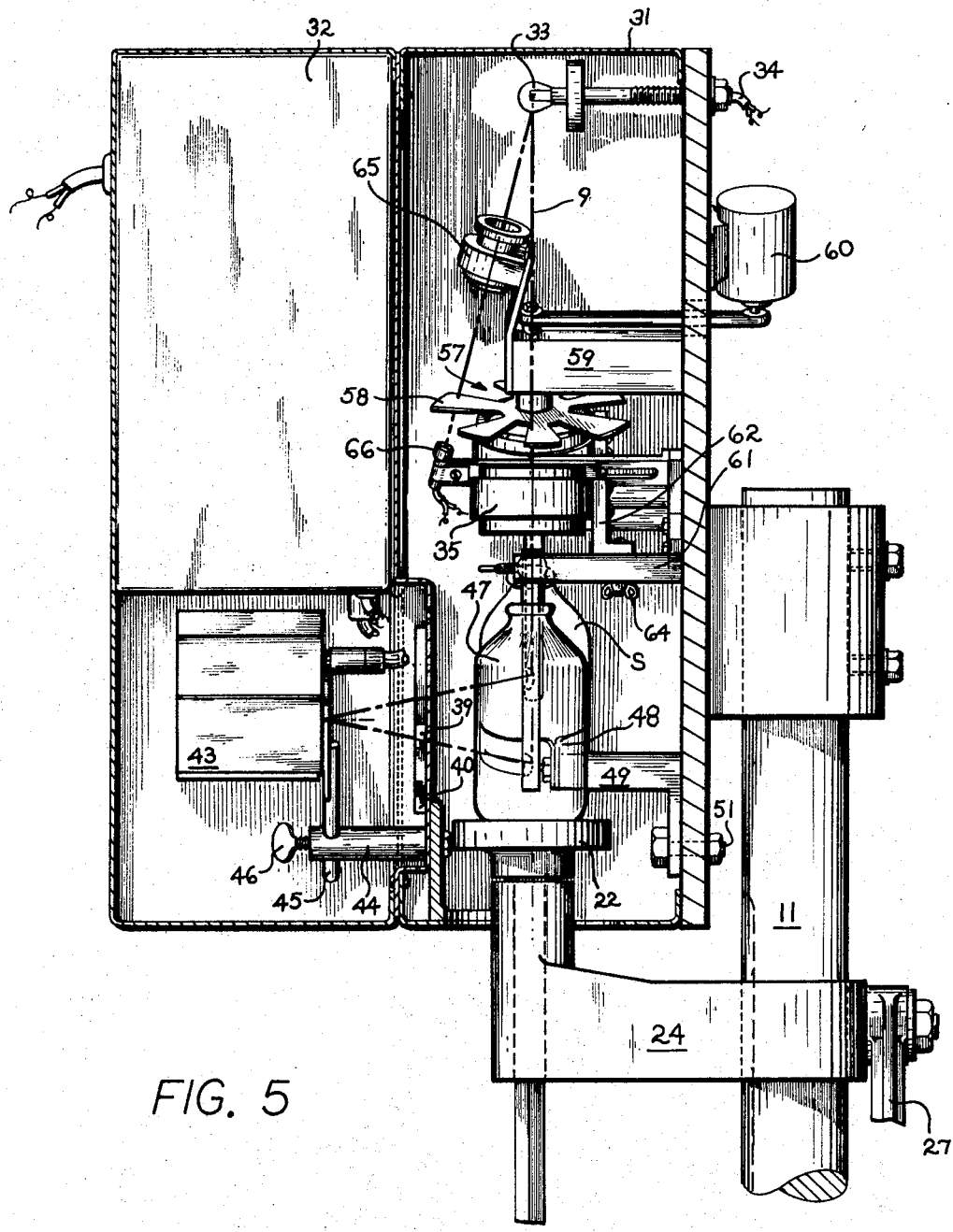
FIG. 5 is a side elevational view of the apparatus of FIG. 4 with one wall removed.

With particular reference to FIGS. 4 and 5, the optical inspection unit will be described in detail.

The inspection unit is basically formed of two rectangular cases 31 and 32 which are hinged together along one edge with the case 31 containing the optical apparatus and case 32 containing the electronic equipment and light sensitive pick-up for providing a comparison of the transmission of light through the test container and the standard container.

Basically, the optical system is a two-channel optical light path emanating from a single source with the two paths of light passing respectively through the test container and the standard container. The two light paths, after passing through the containers, are directed such that they fall on the same photoelectric or photosensitive pick-up element. Of particular importance is that the light paths be the same so that under conditions where the test container and standard container have the same wall thickness, the output of the photoelectric pick-up would be the same. It should be understood that the light passing through the test container is alternated with the light passing through the standard container as far as the pick-up is concerned.

The term "light" as herein used, is intended to include any radiation transmissible through the wall of the article under test and is not limited to radiation within the visible range. The light source chosen will be determined to some extent by the characteristics of the particular kind of glass or material which is being gauged.

Within the case 31 an incandescent light bulb 33 is mounted with suitable electrical connections 34 being connected thereto to provide energization of the light bulb. As shown by the dot-dash line 9, light from the light bulb 33 is focused by condensing lens system 35 into a narrow beam, with the light coming from the condensing lens system 35 passing vertically downward into a hollow tube 36. The tube 36 carries a mirror adjacent its lower end positioned so that light passing down through the tube 36 will be reflected outward therefrom.

An opening 37 is provided in the side of the tube 36 so that light falling on the mirror positioned within the tube 36 will be reflected from the axis of the tube 36 outwardly at an angle of approximately 90°. A rectangular opening 38 is provided in the front wall of the casing 31 through which the light is adapted to pass after emerging from the side wall of the test container. A pair of angle brackets 39 and 40 are fixed to the forward wall of the casing 31 and serve as slideways for a shiftable plate 41. The plate 41 has a circular opening 42 formed therein.

As can be seen when viewing FIGS. 4 and 5, the plate 41 is shiftable so that its opening 42 will be placed in alignment with the rectangular opening 38. The plate 41, with its opening 42, is important from the standpoint that it cuts down the amount of stray light which might pass from within the casing 31 to the outside of the casing where a photosensitive pick-up 43 is positioned. Obviously, the gauging light path from the test container passes through the opening 42 and the plate 41 is adjustable for the purpose of insuring that the light beam will pass centrally through the opening 42. The photosensitive pick-up 43 is mounted to the forward wall of the casing 31 by a stud 44. The stud 44 is bolted to the forward wall of the casing 31 and is provided near its outer end with a diametrically extending opening through which a rod 45 extends. The rod 45 carries the photosensitive pick-up 43 fixed thereto and a clamping screw 46 is threaded in the end of the stud 44 and serves to clampingly engage the side of rod 45, thus providing means for adjusting the position of the rod 45 relative to the stud 44.

The above description covers the optical system for the test container.

An identical optical system is provided for determining the light transmission properties of a standard container 47. The standard container is held within the inspection apparatus by a closely fitting metal band 48. The metal band 48 is bolted to an angle bracket 49 which in turn is bolted to the rear wall of the casing 31. The bracket 49 has a vertical slot 50 formed in the vertical leg thereof through which the fastening bolt 51 extends. With this arrangement, the bracket 49 may be adjusted vertically with respect to the inspection head and obviously the container may be rotated within the band 48 so as to position the standard container 47 in a particular position relative to the beam of light passing through the side wall of the container.

The light source 33 is viewed by a condensing lens system 52 which focuses the light into a fairly narrow beam passing downward through a tube 53, similar to the tube 36. The tube 53 has an opening 54 in the side thereof adjacent its lower end through which light passing axially through the tube 53 is reflected by a mirror positioned within the tube. It should be understood that the standard container 47, when mounted in band 48, has the tube 53 extended axially thereof through the neck of the container.

The angle brackets 39 and 40 support a second plate 55 which is similar to the previously described plate 41. The plate 55 also has an opening formed therein which is adapted to overlie a rectangular opening 56 formed in the forward wall of the casing 31. The plate 55 serves the same purpose as plate 41 in relation to its respective beam of emerging light from the standard container 47. It should be understood that the light directed out of the container 47 falls on the same photosensitive element 43 as does the light passing out of the test container 14. Thus, it can readily be seen that the two light paths are of equal lengths and have as their sources the same light bulb 33 and have as their common pick-up the photosensitive element 43.

In order to accurately compare the intensity of the two light paths, a chopper disc 57 is mounted so that its blades 58, of which there are 7 shown in FIGS. 1 and 5, will alternately intercept both beams of light during rotation of the chopping disc. It should be understood that the number of blades on the chopping disc must always be odd in number so that for each space between blades there will be a full blade in the diametrically opposed position. When a chopping disc having 7 blades is used, a sector of 25.7+° is encompassed by each blade with the identical sector being left open between each blade. When a 5 bladed disc, for example, is used, each blade's width would encompass 36° and each opening between the blades would also cover 36°. The chopping disc is pivotally mounted to a support member 59 which is fixed to the rear wall of the casing 31.

As can be seen in FIGS. 4 and 5, the axis of the disc 57 is positioned at an angle which exactly bisects the angle between the two beams of light being utilized in the inspection. The disc 57 is rotated through a belt drive by motor 60 mounted to the outside of the rear wall of the casing 31.

Each tube 53 and 36 is supported by the rear wall of the casing 31 through mechanism which is capable of providing adjustments. The support members 61 also serve as mounting brackets for the respective condensing lens systems 35 and 52. The condensing lens systems are fixed to support brackets 62 and 63 which in turn are adjustably connected by wing nuts 64 to the support members 61.

As will be later described, a triggering signal is desirable which will indicate the rotational position of the disc 57 in relation to the two optical light paths. The system for providing a triggering signal takes the form of a condensing lens system 65 with its optical axis extending from the light source 33 in a direction where it will be intercepted by the blades 58 of the disc 57. A photosensitive pick-up 66 is adjustably mounted to the rear wall of the casing 31 and is positioned below the disc with its line of sight coincident with the optical axis of the lens system 65.

Figure 6:
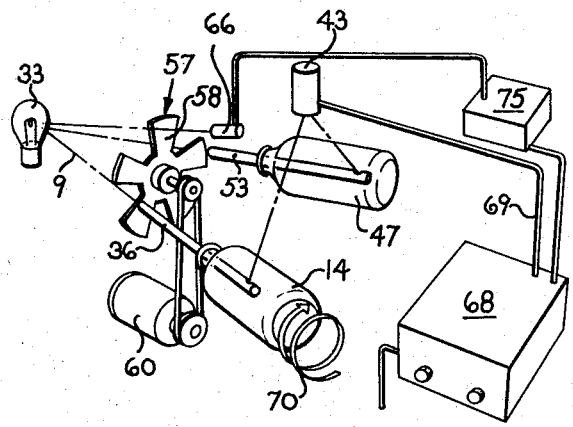
FIG. 6 is a schematic perspective view illustrating the optical system of the invention.
Figure 7:
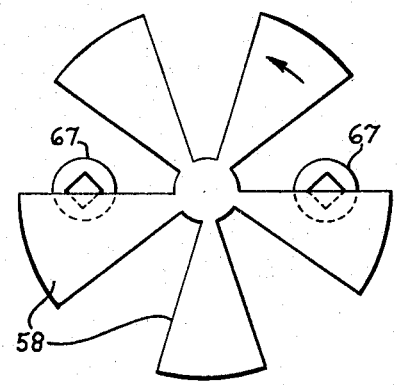
FIG. 7 is a top plan view on an enlarged scale illustrating the light chopping device used in the inspection unit.

Turning now to FIGS. 6 and 7, the functional operation of the inspection apparatus of the invention will be described.

FIG. 6 is a schematic view of the optical system with the same reference numerals applied to the various parts as applied to the detailed FIGURES 4 and 5.

Fundamentally, the light bulb 33 provides beams of light directed axially of the tubes 36 and 53. It should be understood that the light passing down the tubes 36 and 53 will have been focused by lenses, not shown, and that a mask 67 having a square opening therein will be positioned at the ends of the tubes 36 and 53. The masks 67, as illustrated in FIG. 7 have square openings therein, and are oriented such that as the leading edge of one blade 58 of the chopper 57 is beginning to cover the opening in the mask, another blade which is covering the other mask will begin to uncover the other mask to the same extent. In this manner, provided the rotating disc 57 is machined with extreme accuracy, the total light passing into both tubes 36 and 53 will always be of equal intensity, with the relative intensity of light in each tube being conversely related.

While the mask opening 67 is illustrated as being square, it should be pointed out that the opening may have any configuration so long as both masks have the same shape opening.

As previously described, the tubes 36 and 53 have mirrors therein which redirect the beams of light out through the side wall of the test container and standard container respectively. The tubes and mirrors are so arranged that the beams, after passing through the side walls of the containers, fall on a single light sensitive pick-up 43. This pick-up 43 is electrically connected to the electronic measuring system 68 by a lead 69.

As illustrated by the spiral arrow 70, the test container 14 is simultaneously rotated and moved axially with respect to the inspecting head 36. In this manner light passing out of the side wall of the test container 14 will effectively scan the entire wall area of the test container. The standard container 47 is accurately gauged by other means, such as a micrometer, to find a portion thereof which has a predetermined thickness. This portion of the container 47 is then placed in relation to the tube 53 such that the light beam redirected out of the tube 53 will pass through this portion of the container. This then serves as the comparison standard against which the wall thickness of the test container is measured.

Due to the fact that it is extremely difficult to machine a chopping disc so that its edges are precisely located both as to the radial interval and the rotational axis of the disc, it was found desirable to provide a triggering system which will eliminate the periods of transition of the blades of a less precise chopping disc as they move in relation to the masks 67. As illustrated by wave form 9b, the transition period corresponds to negative going spikes 8 shown thereon. By the use of a triggering system, the negative spikes 8, produced during switching of the light from one beam to the other are prevented from disturbing the electronic system 68. The triggering system takes the form of a photocell 66 positioned so that its light beam is interrupted by the disc during that interval when the blades are covering a portion of the openings in the masks 67. The output of the photocell 66 is fed to a preamplifier 75 and the output of the preamplifier is then fed to the electronic system 68.

The electronic system 68 utilized with the present inspection apparatus is illustrated in block diagram in FIG. 8. The signal detector 43, in actual practice, is a silicon solar cell. As the intensity of the light impinging on the detector 43 increases, the voltage output increases in a negative direction.

The signal from the detector 43 is connected to a preamplifier 71. The preamplifier provides a 0° phase shift in the signal so that as the light intensity increases, the voltage output of the preamplifier 71 will go negative. In view of the fact that the chopping disc is difficult to make with precision, the disc actually is designed such that it switches the light beam between the standard ware and the test ware so that in each succeeding beam transfer, the beam being turned on is started on before the beam turned off is started off. In other words, the trailing edge of the chopping disc is cut down approximately .010 inch from the exact radial line passing from the center of the disc. In this way the intensity of the light falling on the solar cell 43 will always be greater during the interval of beam switching than when the beam is passing through the standard ware only.

Reference may be had to FIG. 9, wave form b, which is a representation of the output signal from the preamplifier 71. The negative spikes 72 of this wave form are due to this fact that the disc is uncovering one mask before the other mask is being covered.

Inasmuch as the inspection of containers is primarily for determining whether or not a test container is thinner than a standard container, the significant signals will be those where the intensity of the light beam when passing through the test container is greater than the intensity of light passing through the standard container.

As illustrated in FIG. 9, wave form b, the most positive part 73 of the wave form corresponds to the interval when the beam is passing through a standard container.

Figure 10:
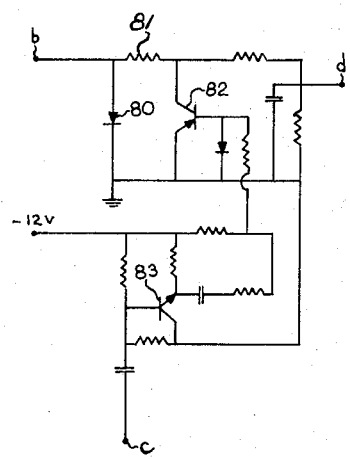
FIG. 10 is a schematic circuit diagram of the clamping and sampling circuit.

The output from the preamplifier 71 is fed into a clamping and stampling circuit 74. The clamping and sampling circuit is shown in detail in FIG. 10. The input signals to the clamping and sampling circuit 74 have an amplified amplitude with the period being the same as the received signals from the silicon solar cell. A clamping diode 80, such as a 1N770, will cause the full potential of the input signal to be applied across a resistor 81 with a switching transistor 82, such as 2N397, having its base negative with respect to the emitter which is connected to ground potential. With this condition present, the transistor 82 is operating at saturation and current will flow through the transistor from the collector to the emitter without any appreciable voltage drop. Thus, all the voltage input to the clamping and sampling circuit 74 will appear across the resistor 81. The clamping diode, in conjunction with a coupling capacitor in the output of the preamplifier 71, sets the most positive level of the signal at zero potential and any change in signal will be negative with respect to the zero level. Thus, with the clamping and sampling circuit 74, the signal having the wave form b is clamped at its most positive part to zero voltage. Therefore, when the beam is passing through the standard ware, the signal output is clamped at zero potential. All other portions of the signal, through design of the chopping disc and thickness of the test ware will be allowed to vary below zero.

The transistor 82 is rendered non-conductive periodically by the operation of the trigger detector 66 and its preamplifier 75 which has its output connected to a pulse shaper 76. The output of the pulse shaper is connected to the base of a transistor 83, such as a T1484, with the emitter of the transistor 83 connected to the base of the transistor 82. The output of the pulse shaper or one-shot multivibrator 76 causes the transistor 83 to provide a square wave positive pulse to the base of the transistor 82. When the base of the transistor 82 becomes more positive with respect to the emitter, transistor 82 is rendered non-conducting to a great extent and the voltage across the resistor 81 passes out of the sampling circuit 74 and this instantaneous value of the test ware signal will have the wave form d of FIG. 9. The signal from the sampling circuit is timed by the Schmitt trigger 75 and shaper 76 so that the instantaneous signal from the sampling circuit will be indicative of the transmission properties of the test container.

The above-described pulse shaper 76 may be a one-shot multivibrator of the type manufacture by the Engineered Electronics Company and described in their Catalogue No. 859, Dec. 1, 1961, under the designation T–166.

If the test ware is as thick or thicker than the standard ware, the test ware signal will be equal to or more positive than the standard ware signal. In this case, the test ware portion 77 of the signal b of FIG. 9 will be clamped to zero volts and the output of the clamping and sampling circuit 74 will be zero.

If the test ware is thinner than the standard ware, there will be a pulse output from the circuit 74 which will have the wave form d of FIG. 9. This pulse is amplified by amplifier 78 which may be a product of the Engineered Electronics Company and described in their above-referred-to catalogue under the designation T–108.

The output of the amplifier will have the wave form e of FIG. 9 and is connected to a reject level detector circuit 79 where the signal is clamped again, only this time the signal is permitted to go above zero volts only. An example of the reject level detector 79 may be that described in the Engineered Electronics Company catalogue referred to above under the designation T–172.

While the above-referred-to circuit designated T–172 is primarily a voltage comparator, this transistorized circuit can also be used as a level detector when the reference voltage input is biased by a Zener diode and resistor network.

When the signal is great enough to operate the reject level circuit, a standard pulse of 8 volts, for example as shown in wave form f of FIG. 9, will be put out by the reject level detector 79. The 8 volt pulse received in the signal shaper 85 will trigger the shaper with the output of the shaper having the wave form g of FIG. 9. The shaper 85 may be the same as the previously described one-shot multivibrator 76, this also being under the manufacturer's designation T–166.

The principal function of the one-shot multivibrator is to provide satisfactory pulse width generation with the circuit being triggered by a positive pulse or positive going input step. Because of the increased pulse width, the shaper circuit 85 lengthens the pulse output to ensure that the reject circuit 86 will have time to fire. The reject circuit 86 may take the form of a reject solenoid and through a suitably synchronized time delay system will operate to segregate containers that have thin spots in the walls thereof.

Other and further modifications may be restored to within the spirit and scope of the appended claims.

We claim:

1. Apparatus for comparing the wall thickness of transparent test containers with the wall thickness of a standard container comprising a first inspection head, a source of light, means for directing a narrow, focused beam of light from said head against the inner wall surface of said test container, photoelectric means positioned outside of said container in the path of said beam passing through the container wall, a second inspection head, means within said second head for directing a narrow, focused beam of light from said head through the inner wall of said standard container, said means for directing the light in said second head being adapted to impinge said narrowed beam onto said photoelectric means, means for alternately intercepting said beams in their paths of travel from said source to said photoelectric means, means responsive to the interruption of said beams for providing a triggering signal when the light from the first head is on the detector, conditioning means connected to said photoelectric means, means connecting the trigger signal output to the conditioning means for passing signals from the conditioning means only during the period when the light is received from the first head and means connected to said trigger means for comparing the signals from the conditioning means.

2. Apparatus according to claim 1 in which said means for directing the beams of light includes mirrors positioned to receive light axially of the containers and to redirect the light radially of the containers.

3. Apparatus according to claim 1, including means for effecting relative rotation between said beam and said container.

4. Apparatus as defined in claim 3, including means for moving the test container axially.

5. Apparatus for comparing the wall thickness of transparent containers with the wall thickness of a standard container comprising an inspection head, means for introducing said head within said container, means for directing a narrow, focused beam of light by said head against the wall surface of said container, photoelectric means positioned outside of said container in the path of said beam passing through the container wall, a second inspection head positioned within the standard container, means within said second head for directing a narrow, focused beam of light from said head through the wall of said standard container, said means for directing the light in said second head being adapted to impinge said narrow beam onto said photoelectric means, means for alternately intercepting said beams in their paths of travel to said photoelectric means whereby said photoelectric means receives continuous illumination which, during one interval, has the intensity of light passing through the standard container and at the other interval the intensity of the light passing through the test container, means responsive to the interruption of said beams for providing a triggering signal when the light from the first head is on the detector, conditioning means connected to said photoelectric means, means connecting the trigger signal output to the conditioning means for passing signals from the conditioning means only during the period when the light is received from the first head and means connected to said trigger means for comparing the signals from the conditioning means.

6. Apparatus according to claim 5, in which said means for directing the beams of light comprises mirrors positioned to receive light axially of the respective containers and to redirect the light radially of the containers.

7. Apparatus according to claim 5, including means for effecting relative rotation between said first inspection head and said test container.

8. Apparatus as defined in claim 7, including means for moving the test container axially of the first inspection head.

9. Apparatus for comparing the wall thickness of transparent containers with the wall thickness of a standard container comprising an inspection head, means for introducing a portion of said head within said test container, means for directing a narrow focused beam of light by said head against the inner wall surface of said test container, photoelectric means positioned outside of said container in the path of said beam passing through the container wall, a second inspection head having a portion thereof extending within the standard container, means in said second head for directing a narrow focused beam of light from said head through the wall of said standard container and onto said photoelectric means, means for alternately intercepting said beams in their paths of travel to said photoelectric means so that said photoelectric means has continuous illumination of approximately the intensity of light passing through the standard container and means connected to said photoelectric means for individually comparing the distinct successive outputs of said photoelectric means to a predetermined reference level, and means connected to said comparing means for algebraically subtracting the resulting signals.

10. Apparatus for comparing the wall thickness of transparent test containers with the wall thickness of a standard container comprising a first inspection head, a source of light, means for directing a narrow, focused beam of light from said head against the inner wall surface of said test container, photoelectric means positioned outside of said container in the path of said beam passing through the container wall, a second inspection head, means within said second head for directing a narrow, focused beam of light from said head through the inner wall of said standard container, said means for directing the light in said second head being adapted to impinge said narrowed beam onto said photoelectric means, means for alternately interrupting the two light paths with the period of transition presenting light to the photoelectric means which is more intense than when passing through the standard container, means responsive to the interruption of said beams for providing a triggering signal when the light from the first head is on the detector, means connected to said photoelectric means for conditioning the signals received thereby to a predetermined reference level corresponding to the most positively received signal, means connecting the trigger signal output to the conditioning means for passing signals from the conditioning means only during the period when light is received from the first head, means for comparing the signals from the conditioning means with a reference signal corresponding to said predetermined reference level and means for actuating a reject signal when the last mentioned signals are different to a predetermined extent.

References Cited

UNITED STATES PATENTS

| | | | |
|---|---|---|---|
| 2,525,445 | 10/1950 | Canada | 88—14 |
| 2,528,924 | 11/1950 | Vassy | 88—14 |
| 2,548,755 | 4/1951 | Vossberg et al. | 250—219 |
| 2,755,703 | 7/1956 | Politsch et al. | 250—223 |

RALPH G. NILSON, *Primary Examiner.*

M. A. LEAVITT, *Assistant Examiner.*